Dec. 12, 1967          G. A. NOBLE          3,358,116
METHOD AND APPARATUS FOR WELDING CONTROL CIRCUIT
Filed Sept. 30, 1963          3 Sheets-Sheet 1
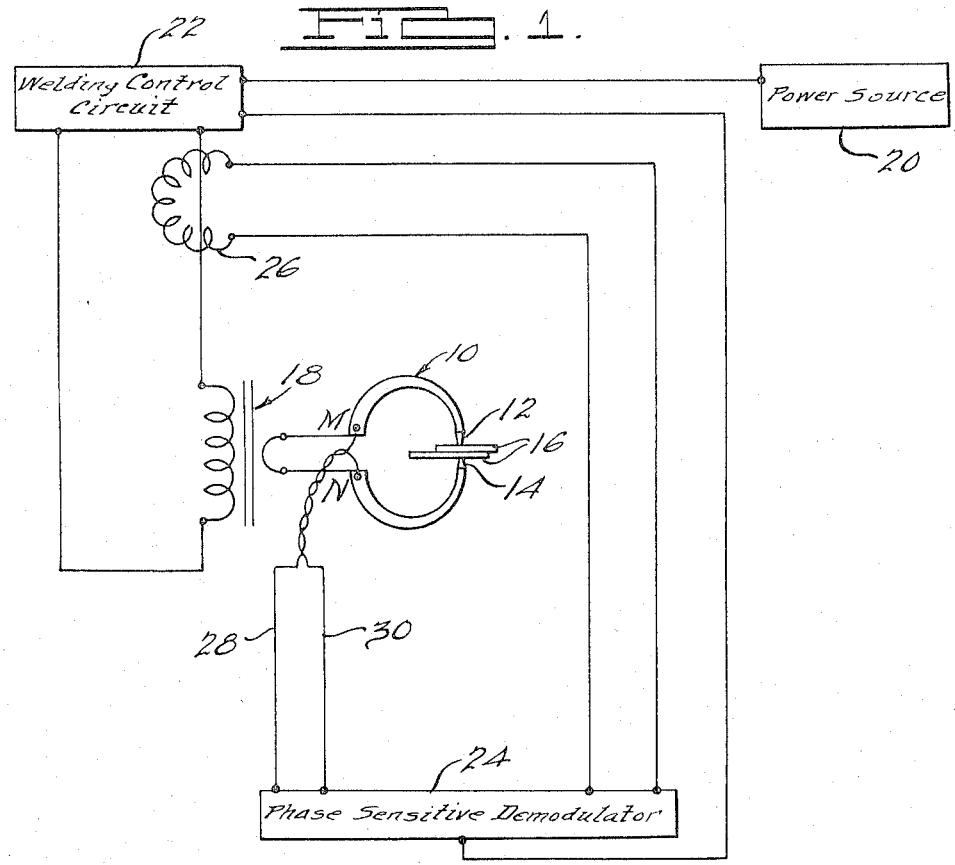
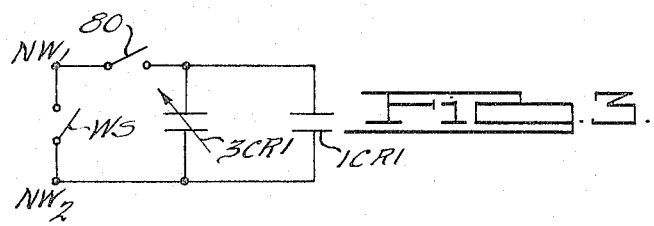
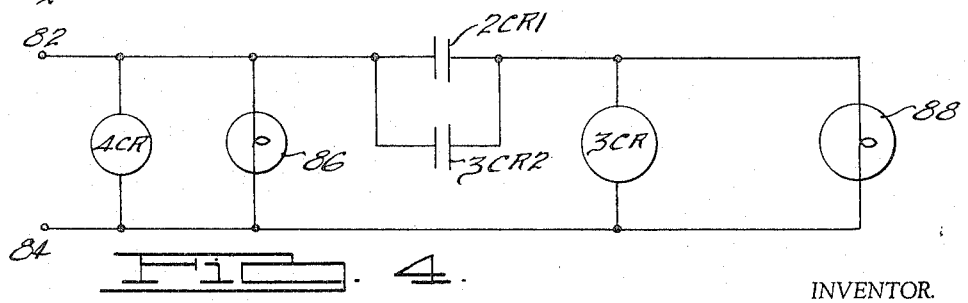
INVENTOR.
Gardiner A. Noble.
BY
Harness and Harris
ATTORNEYS.

INVENTOR.
Gardiner A. Noble.
BY
Harness and Harris
ATTORNEYS

INVENTOR.
Gardiner A. Noble
BY
Harness and Harris
ATTORNEYS

United States Patent Office 3,358,116
Patented Dec. 12, 1967

3,358,116
METHOD AND APPARATUS FOR WELDING CONTROL CIRCUIT
Gardiner A. Noble, Farmington, Mich., assignor to Chrysler Corporation, Highland Park, Mich., a corporation of Delaware
Filed Sept. 30, 1963, Ser. No. 312,760
9 Claims. (Cl. 219—110)

ABSTRACT OF THE DISCLOSURE

A weld current control circuit and method for a resistance welding apparatus having a sensing device connected across the welding tool throat at points substantially spaced from the electrodes in which compensation is provided for unreal power components.

---

A major problem in resistance welding is the provision of a control system that compensates for the erosive type of electrode wear associated with resistance welding, particularly as is present in the welding of galvanized steel. It is further essential that the control exercised over the electrode power input be a function of wattage only. Otherwise stated, the control exercised can be precise and sensitive only if the effect of substantially all of the quadrature power is eliminated from the control signal utilized.

Accordingly, it is an object of the present invention to provide a weld control circuit apparatus and method in which a voltage signal derived from an air toroid pick-up coil and representative of current flow through the power transformer is combined with a voltage signal derived from the throat of the welding tool in such a manner that the unreal or reactive portion of the throat signal is suppressed to provide a control output directly proportional to real power dissipated in the loop of the welding tool.

It is a further object of this invention to provide a weld control circuit in which the voltage pick-up leads are spaced from the electrode and located proximate the throat area of the welding tool to minimize damage to those leads.

It is an additional object of this invention to provide a weld control apparatus and process which compensates for shunt current, electrode wear, and line voltage variations to exercise a precise control over the heat on-time of the resistance welding operation.

It is a still further object of this invention to provide a weld control circuit by which an indication of an acceptable quality weld is furnished on each cycle.

The foregoing as well as additional objects and advantages will become apparent from the following detailed description wherein reference is made to the accompanying drawings, in which:

FIGURE 1 is a combined block diagram and schematic showing of the present invention in conjunction with a resistance welding apparatus;

FIGURES 3 and 4 are schematics showing the welding time sequence control relay system;

Figure 2:
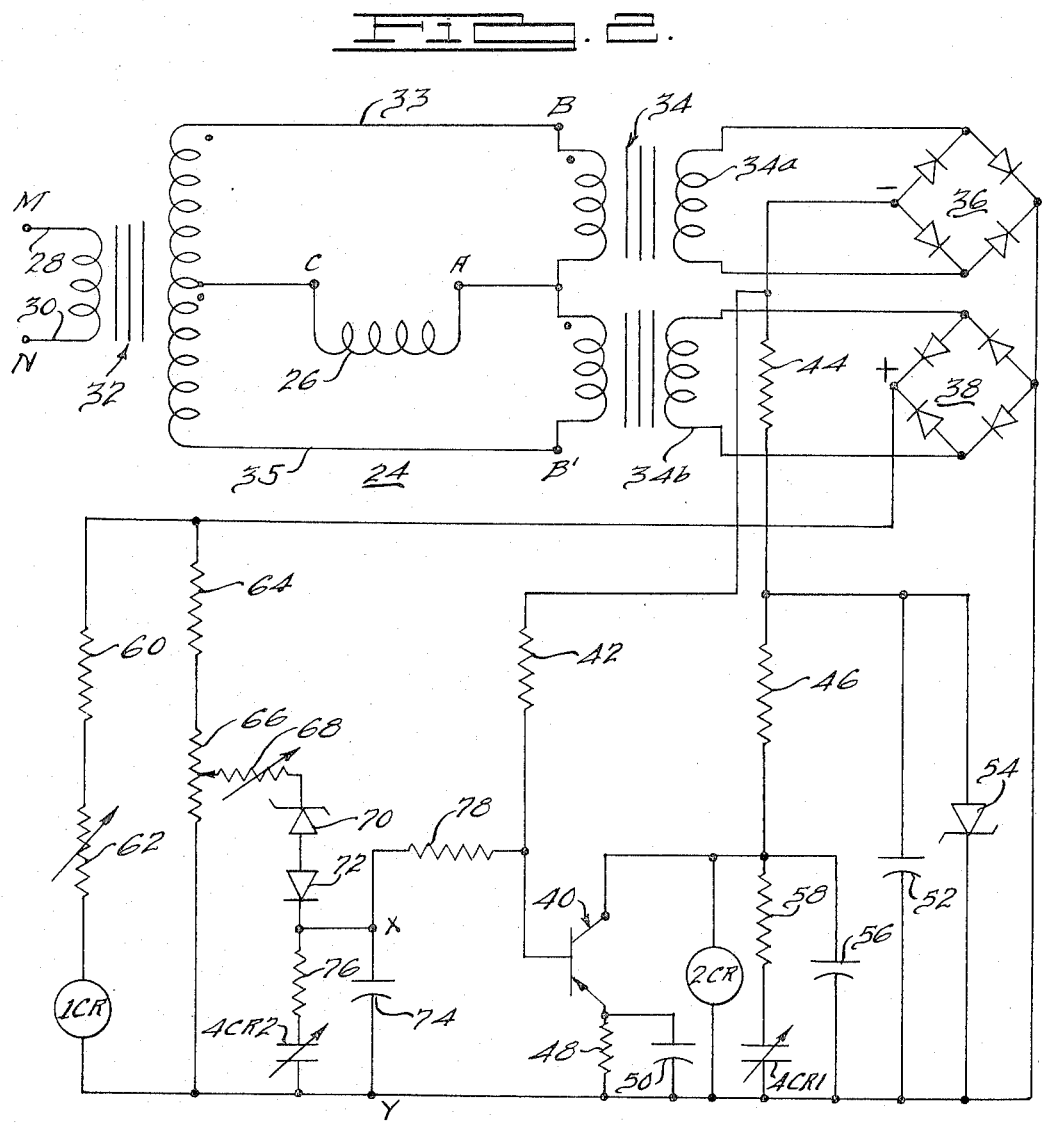
FIGURE 2 is a schematic diagram of the welding control circuit showing the phase sensitive demodulator and associated control components.

FIGURE 1 shows a resistance welding tool 10 having electrodes 12, and 14 engageable with a pair of workpieces 16 to be welded. Welding tool 10 is adapted to receive an alternating current through the secondary winding of power input transformer 18 in a manner well known in the welding art. Power input transformer 18 receives its power input from alternating current power source 20 which power input is controlled with respect to a predetermined timing sequence through the progressive steps of squeeze, weld, hold, and off stages by welding time sequence control circuit 22 which will be shown and described in connection with FIGURES 3, 4 and 5, hereinafter. Welding time sequence control circuit 22, in turn, is operatively connected to and controlled in its operation through the output of a phase sensitive demodulator 24. Demodulator or mixer stage 24 is provided with a voltage input signal from a current air toroid pickup coil 26 which signal is representative of the current passing through the primary lead of power input transformer 18. Pickup coil 26 alternately may be connected to the secondary lead of power input transformer 18. Demodulator 24 further is provided with a voltage signal input from across the throat of welding tool 10 by inductively wound pickup leads 28, and 30. It is noted that leads 28 and 30 are substantially spaced from the electrodes 12 and 14 which affords protection from damage to these elements in actual use of the apparatus in a production operation. The location of voltage pickup leads 28 and 30 is such that the voltage sensed at the throat area of the welding tool 10 is that occurring across the combined resistances offered to welding current flow by the resistance of the welding tool, the resistance of the electrodes 12 and 14 (which vary with charges in electrode cross-sectional area), the resistance of the electrode interfaces (which vary with oxide formation, particularly with the formation of zinc, copper oxides in galvanized material resistance welding) and the resistance of the workpiece 16. Consideration of the electrical welding circuit further indicates the presence of substantial inductance in the welding input transformer and welding cable as well as in the welding tool itself. The presence of this inductance in the welding circuit indicates that it is most important that any welding control circuit operating on a feed back control signal must eliminate from that signal all or almost all of the effect of the variable inductance if the welding control circuit is to operate with any real degree of sensitivity. The attainment of this objective is a primary concern of the present invention.

FIGURE 2 shows the phase sensitive demodulator referred to generally by the numeral 24. Demodulator 24 comprises a pair of center tapped transformers 32 and 34 with their secondary and primary windings, respectively, serially connected as shown by leads 33 and 35. In the exemplary embodiment, representative values of resistance for the respective windings were 4 ohms for the primary of transformer 32, 200 ohms each for the four individual windings which constitute the secondaries of transformer 32 and the primaries of transformer 34, while the secondary windings 34a and 34b of transformer 34 had a resistance value of 5000 ohms each. It will be seen that the welding tool throat voltage sensed by pickup leads 28 and 30 is provided as an input to the primary of transformer 32 while the air current toroid 26 is connected to provide a voltage input across the center taps. Polarities of the respective windings are as indicated by the common dot convention. Full wave rectifier 36 is connected to the output of secondary winding 34a of transformer 34 to provide a biasing current source for the electronic switching means utilized, in the present instance, PNP transistor 40. Full wave rectifier 38 provides the control voltage output from secondary winding 34b which is directly proportional to the real power utilized in the welding tool. Further consideration and description as to the manner in which this elimination of the effect of quadrature power components is accomplished in phase sensitive demodulator 24 will be given in the section "Description of Operation" hereinafter. Biasing current is furnished from the negative terminal of rectifier 36 through resistor 42 to the base of transistor 40. Collector biasing current is provided from the negative terminal of rectifier 36 through resistors 44 and 46. A parallel RC network comprising resistor 48 and capacitor 50 is connected to provide a constant bias to the emitter of transistor 40. Capacitor 52 and Zener diode 54 are parallel connected as an overvoltage protective network across the collector-emitter circuit of transistor 40 and resistor 46 in the manner shown. Also connected in the collector-emitter circuit of transistor 40 is the operating coil of relay 2CR which in turn is shunted by a capacitor 56 and resistor 58 which resistor is serially connected with the normally closed relay contacts 4CR1 of relay 4CR. The control voltage output of rectifier 38 is directed from its positive terminal through fixed resistor 60 and rheostat 62 to the coil of relay 1CR. The control voltage output is further passed through fixed resistor 64, potentiometer 66, rheostat 68, Zener reference diode 70, and diode 72 in the charging network for capacitor 74. The slider of potentiometer 66 is selectively adjustable to vary the sensitivity of the feedback system. Capacitor 74, further, is shunted by resistor 76 and the serially connected, normally closed relay contacts 4CR2 of relay 4CR. Resistor 78 is connected in the discharge path of capacitor 74 and to the base of transistor 40. It will thus be seen that transistor 40 is adapted to be held on for the duration of the weld time cycle. Responsive to the charging of capacitor 74 to a predetermined level in responsive to the control voltage output of mixer 24, transistor 40 will have its base potential raised to a sufficient positive magnitude to turn it off and terminate the weld cycle through the action of relay 2CR.

FIGURES 3 and 4 show the welding time sequence control relay system which includes relays 3CR and 4CR and previously shown relays 1CR and 2CR. The weld control system includes the terminals NW1 and NW2 operatively connected between the output of power source 20 and power input transformer 18 and manually operable through the closure of welding switch WS. To provide for automatic timing, control switch 80 is included as shown. The normally closed contacts of relay 3CR1 and normally open contacts of relay 1CR1 are included in shunt as shown. A source of operating potential for relays 3CR and 4CR is provided at terminals 82 and 84. White and red cycle indicator lamps 86 and 88 are connected in the circuit in the manner indicated. Normally open contacts 2CR1 and 3CR2 are shunt connected as shown.

*Description of operation*

Figure 5:
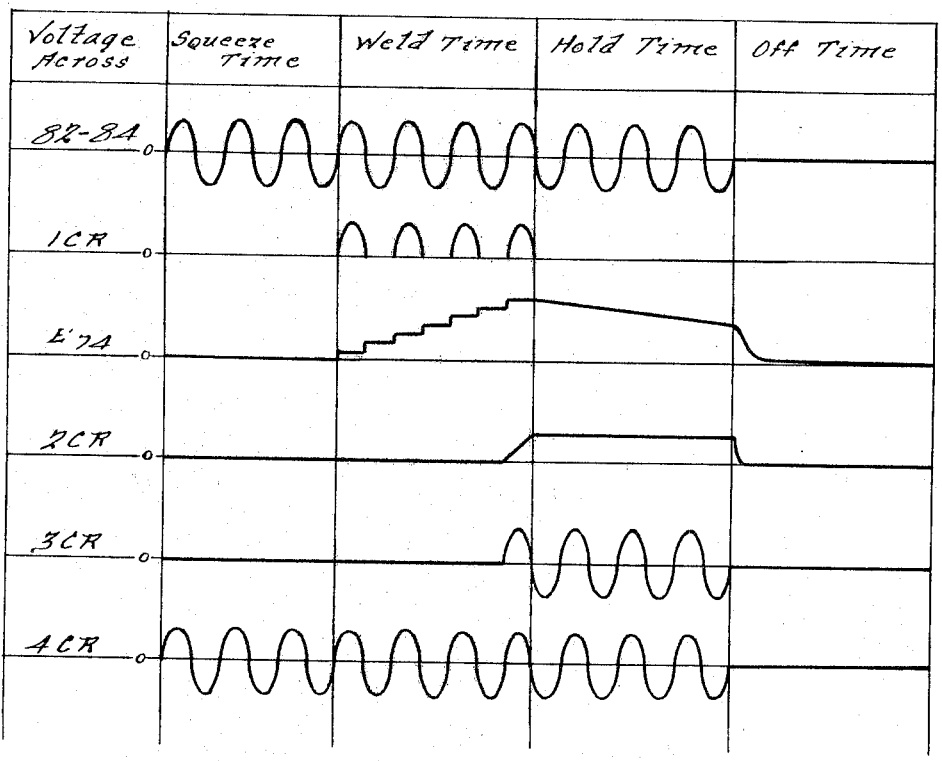
FIGURE 5 is a voltage waveform diagram showing the timing of operation of certain essential elements of the welding sequence control relay system.

The description of operation will now be made with particular reference to the voltage waveforms of FIGURE 5. Application of operating potential across terminals 82 and 84 initiates the "squeeze" action which continues through the "weld" and "hold" cycle times. Power flow during the "weld" time through input transformer 18 from power source 20 is accomplished by the closure of switch 80 which may be performed manually. Transistor 40 is biased "on" responsive to the output of phase demodulator 24 through rectifier 38 also as shown in FIGURE 2. Conduction of transistor 40 provides a current flow in its emitter-collector circuit which holds the normally open contacts 2CR1 open. When the voltage magnitude across capacitor 74 i.e. across points $x$ and $y$ is at a sufficiently high potential, the output to the base of transistor 40 shuts it off. As this point, contacts 2CR1 are closed to activate relay 3CR. Relay 3CR is employed to insure positive cut-off action across terminals NW1 and NW2 which is accomplished by opening of its normally closed contacts 3CR1 across the aforesaid terminals. It should be noted that relay 1CR is normally utilized only in welders where the welder is employed to weld more than one combination of metal thickness. Relay 1CR is accordingly preset to fire only when the voltage exceeds some predetermined value that can be associated with the thicker parts. If utilized in the circuit, relay 1CR serves to override the effect of the 3CR1 contacts across terminals NW1 and NW2. Relay 4CR is utilized for the purpose of insuring that the capacitors associated with its normally closed contacts 4CR1 and 4CR2, namely, capacitors 56 an 74 of FIGURE 2 are completely discharged at the beginning of every welding cycle. Once initiated, relay 4CR remains in this condition until the final "off" time begins. Simultaneously with the activation of relay 4CR, white indicator light 86 is lit and remains in that condition throughout the welding cycle. If, after the "weld time" portion of the cycle has been initiated, insufficient power has been applied to charge capacitor 74 to a voltage sufficient to turn off transistor 40, relay 2CR will not be activated and red light 88 will not be lit. If, on the other hand, the weld is a good one, relay 2CR will be activated thereby lighting indicator light 88 as an indication of its acceptability.

Figure 6:
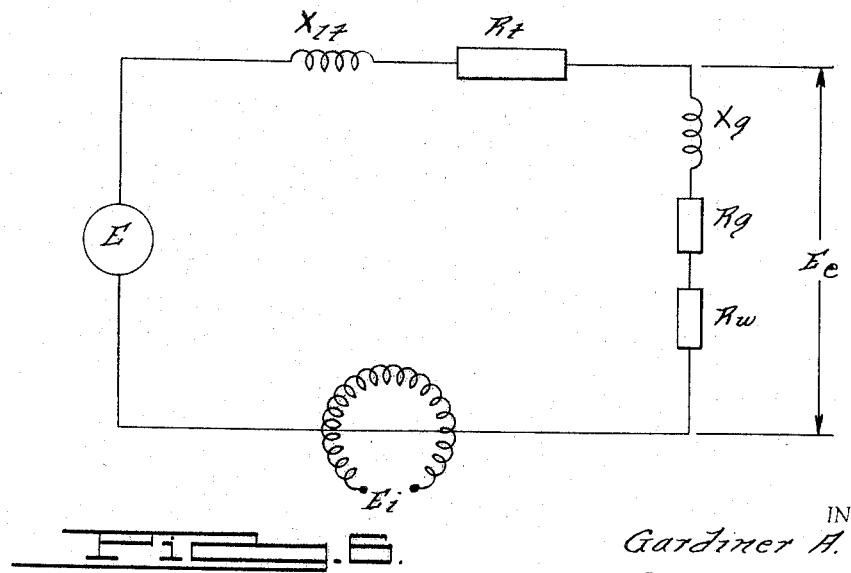
FIGURE 6 is an equivalent circuit of the resistance welder.

An essential feature of the present invention is the provision of a feedback control system which is representative of the real power dissipated in the welding operation and essentially free from inductive effect in the system as has been previously been emphasized. To consider the manner in which this has been accomplished, reference must now be made to the resistance welder equivalent circuit as shown in FIGURE 6 and to the circuit of FIGURE 2. In FIGURE 6, $X_{1t}$ is the reactance of the secondary loop excluding that of the welding tool itself. E is the open circuit voltage of the secondary of the welding transformer 18. $R_t$ represents the resistance of the secondary loop excluding that of the welding tool. $Xg$ and $Rg$ are the parameters of resistance and reactance of the welding tool. $Rw$ represents the resistance of the work engaged between the welding electrodes. $Ei$ represents the voltage output signal from the air toroid pickup coil 26 and across terminals CA of FIGURE 2 while $Ee$ is the voltage across the welding tool as indicated in FIGURE 6. If I represents the current flowing through the welding tool, it will be seen that the following relationship is true.

$$Ee = I(Rg + Rw + jXg) \quad \text{(Equation 1)}$$

$$Ei = jIK \quad \text{(Equation 2)}$$

wherein K is a function of the geometric configuration of coil 26 and its number of turns.

Reference to FIGURE 2 shows the following relationship exists if transformer 32 is a step-up transformer with a turns ratio of 10 to 1 and a center tapped secondary:

$$E_{AB}' = 5Ee - \tfrac{1}{2}Ei \quad \text{(Equation 3)}$$

By substitution from Equation 1:

$$E_{AB}' = I[5(Rg + Rw) + j(5Xg - \tfrac{1}{2}K)]$$

$$\quad \text{(Equation 4)}$$

Similarly, it will be seen that the following relationships exist:

$$E_{AB} = 5Ee + \tfrac{1}{2}Ei \qquad \text{(Equation 5)}$$

$$E_{AB} = I[5(Rg + Rw) + j(5Xg + \tfrac{1}{2}K)] \qquad \text{(Equation 6)}$$

The geometric configuration and number of turns of torroid pickup coil 26 are fixed so that the following equality exists:

$$\tfrac{1}{2}K = 5Xg \qquad \text{(Equation 7)}$$

Then, it follows that $$E_{AB}' = 5(Rg + Rw)I \qquad \text{(Equation 8)}$$

and $$E_{AB} = [5(Rg + Rw) + j10Xg]I \qquad \text{(Equation 9)}$$

If Equation 8 is rewritten, $$E_{AB}' = 5RgI + 5RwI \qquad \text{(Equation 10)}$$

The voltage drop across A and B, $E_{AB}'$, equals the voltage drop across the work, $E_S$, plus the voltage drop across the welding tool, $E_R$, so that $$E_{AB}' = E_R + E_S \qquad \text{(Equation 11)}$$

From Equations 10 and 11 it follows that $$E_R = 5RgI \qquad \text{(Equation 12)}$$

and $$E_S = 5RwI \qquad \text{(Equation 13)}$$

From Equation 9, since $10Xg \gg 5(Rg + Rw)$, $$E_{AB} \cong j10Xg \qquad \text{(Equation 14)}$$

The rectified voltage signal furnished to the base of transistor 40, $E_{B2}$, may be expressed as follows:

$$E_{B2} = \frac{10Xg}{n}$$

wherein $n$ is a number larger than one and is determined by the value of resistor 42.

It will be thus seen that if $Xg$, the reactance of the welding tool, increases $E_{B2}$ will proportionately increase. If there has been an increase in $E_{B2}$ in its negative value at the start of weld time, then $E_R$ as represented by the rectified output of $E_{AB}'$ to point X must charge capacitor 74 to a higher positive potential to reduce $E_{B2}$ to the critical shut-off voltage of transistor 40 during weld time. It will thus be apparent that transistor 40 will be turned off independent of the value of $Xg$ and responsive to the true wattage dissipated in the loop of the welding tool.

Accordingly, it will be seen that I have provided a welding control circuit particularly useful in the field of resistance welding which circuit is both simple with respect to the components utilized and precise with respect to the exercise of its control function.

I claim as my invention:

1. In an electrical resistance welder having an alternating power source, a welding transformer connectible to said source and having a welding tool with work engaging electrodes in its secondary circuit, a control system for regulating power flow from said source responsive to wattage dissipated in the welding tool, comprising a first sensing device operatively connected to a winding of said welding transformer for providing a voltage signal representative of current flow therethrough, a second voltage signal sensing device connected across said tool at points spaced and remote from said electrodes, a mixer operatively connected to the output of the aforesaid devices and operable to combine said voltage signals, said mixer being of the phase sensitive demodulator type and comprising an input transformer and an output transformer having their secondary and primary windings respectively connected and each having a center tap, said first sensing device connected across said center taps, said second sensing device operatively connected to the primary winding of said input transformer, and said output transformer operable to provide through its secondary winding a voltage output directly proportional to the wattage dissipated in the welding tool.

2. The combination as set forth in claim 1 in which said control means comprises an electromagnetic relay connected to and controlling the output from said source in which an electronic switching means is operatively connected to and controlling the operation of said relay, and a resistor-capacitor charging network is connected between the rectified output of said output transformer and said switching means for controlling its triggering responsive to a predetermined voltage output.

3. The combination as set forth in claim 2 in which said switching means comprises a transistor having its collector and emitter connected across the terminals of said relay and its base connected in the discharge path of said capacitor.

4. The combination as set forth in claim 2 in which one half of said output transformer secondary is utilized to provide a rectified biasing current to the electrodes of said switching means and the other half is utilized to provide a rectified voltage output directly proportional to the wattage dissipated in the welding tool to the control electrode of said switching means.

5. The combination as set forth in claim 2 in which said resistor-capacitor network includes a weld time rheostat for selectively varying the charging time constant of said network.

6. The combination as set forth in claim 2 in which a weld quality indicator means is operatively connected to said switching means and is energized responsive to its triggering.

7. In an electrical resistance welder having an alternating power source, a welding transformer connectible to said source and having a welding tool with work engaging electrodes in its secondary circuit, a control system for regulating power flow from said source responsive to wattage dissipated in the welding tool including a first sensing device comprising a current air toroid placed around one of the primary current carrying leads of said transformer for providing a phase displaced voltage signal representative of current flow therethrough, a second voltage signal sensing device connected across said tool at point substantially spaced from said electrodes, a mixer operatively connected to the outputs of the aforesaid devices and operable to combine said voltage signals and suppress the effect of the imaginary portion of the voltage signal, and control means operatively connected to said power source and responsive to the output of said mixer to interrupt power to said welding transformer.

8. In an electrical resistance welder having an alternating power source, a welding transformer connectible to said source and having a welding tool with work engaging electrodes in its secondary circuit, a control system for regulating power flow from said source responsive to wattage dissipated in the welding tool including a first sensing device comprising a current air toroid placed around one of the secondary current carrying leads of said transformer for providing a phase displaced voltage signal representative of current flow therethrough, a second voltage signal sensing device connected across said tool at points substantially spaced from said electrodes, a mixer operatively connected to the outputs of the aforesaid devices and operable to combine said voltage signals and suppress the effect of the imaginary portion of the voltage signal, and control means operatively connected to said power source and responsive to the output of said mixer to interrupt power to said welding transformer.

9. The method of welding power control for a resistance welder including a pair of electrodes connected through a welding tool across a secondary winding of a power transformer comprising the steps of deriving a first voltage signal from the input to the primary winding of said transformer by an air toroid pickup, deriving a second voltage signal across said tool at points substantially displaced from the electrodes, combining the aforesaid signals in a phase sensitive demodulator to reduce the effects of unreal power components in one output and to correspondingly increase the effects of unreal power components in another output, and providing a net output from these to control the power input to said welding tool from said power transformer.

References Cited

UNITED STATES PATENTS

| | | | |
|---|---|---|---|
| 1,959,690 | 5/1934 | Roth | 219—110 |
| 1,991,414 | 2/1935 | Rees | 219—110 |
| 2,306,593 | 12/1942 | Collom | 219—110 |
| 2,472,043 | 5/1949 | Callender | 219—110 X |
| 2,486,552 | 11/1949 | Callender | 219—110 |
| 2,958,044 | 10/1960 | Storm et al. | 219—110 X |

RICHARD M. WOOD, *Primary Examiner.*

B. A. STEIN, *Assistant Examiner.*